United States Patent

Kamura et al.

[11] Patent Number: 5,870,992
[45] Date of Patent: Feb. 16, 1999

[54] COMBUSTION CONTROL DEVICE FOR INTERNAL COMBUSTION ENGINE

[75] Inventors: Hitoshi Kamura; Kenjiro Hatayama, both of Kyoto; Atsuyoshi Kojima, Nagaokakyo; Masato Yoshida, Nagaokakyo; Katsuhiko Miyamoto, Kyoto, all of Japan

[73] Assignee: Mitsubishi Jidosha Kogyo Kabushiki Kaisha, Tokyo, Japan

[21] Appl. No.: 914,653

[22] Filed: Aug. 19, 1997

[30] Foreign Application Priority Data

Aug. 20, 1996 [JP] Japan ...................... 8-218584

[51] Int. Cl.$^6$ ...................... F02B 5/00
[52] U.S. Cl. ...................... 123/305
[58] Field of Search ...................... 123/305, 295, 123/299, 300, 430, 478, 276

[56] References Cited

U.S. PATENT DOCUMENTS

| | | | |
|---|---|---|---|
| 5,078,107 | 1/1992 | Morikawa | 123/295 |
| 5,722,363 | 3/1998 | Iida et al. | 123/305 |
| 5,740,777 | 4/1998 | Yamamoto et al. | 123/305 |
| 5,749,334 | 5/1998 | Oda et al. | 123/305 |

FOREIGN PATENT DOCUMENTS 7102976A 4/1995 Japan ...................... 123/305

*Primary Examiner*—Raymond A. Nelli

[57] ABSTRACT

In a combustion control device for an internal combustion engine provided with a plurality of fuel injection modes having different target air-fuel ratios, threshold values for detecting deterioration of combustion in the internal combustion engine are determined separately for each fuel injection mode depending on features of variation of combustion in the internal combustion engine in each fuel injection mode. Quantity of variation of combustion in the internal combustion engine is, for example, detected in the form of revolution angular acceleration or revolution angular acceleration deviation of the engine. The detected quantity of revolution fluctuation is compared with a threshold value in the currently chosen fuel injection mode. Thus, deterioration of combustion is surely judged according to each fuel injection mode. In particular, threshold values in a compression stroke injection mode are determined to be larger than threshold values in an intake stroke injection mode. A threshold value in the compression stroke injection mode is so determined as to substantively correspond to a complete misfire state of the engine, and threshold values in the intake stroke injection mode consist of a first threshold value substantively corresponding to a complete misfire state of the engine and a second threshold value substantively corresponding to an unstable combustion state of the engine.

7 Claims, 5 Drawing Sheets

F I G. 3
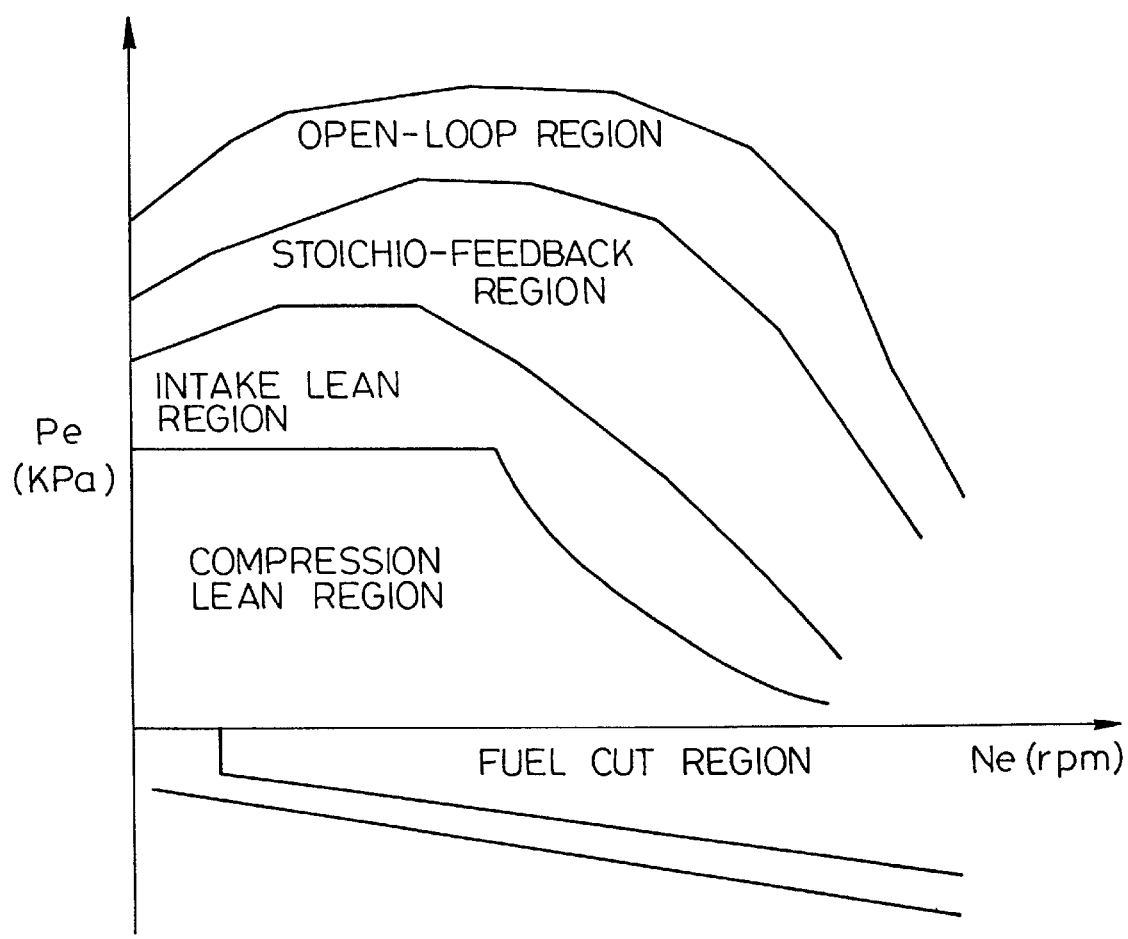

COMBUSTION CONTROL DEVICE FOR INTERNAL COMBUSTION ENGINE

BACKGROUND OF THE INVENTION

1. Field of the Invention

The present invention relates to a combustion control device for an internal combustion engine provided with a plurality of fuel injection modes to be driven selectively changing the fuel injection mode, the combustion control device being so provided as to surely judge deterioration of a state of combustion in the internal combustion engine according to a fuel injection mode currently chosen from those fuel injection modes.

2. Description of the Prior Art

A lean-burn engine, which is one of the internal combustion engines, is driven at an air-fuel ratio leaner than the theoretical mixture ratio, thereby to improve rate of fuel consumption. A direct injection type gasoline engine is an engine which injects fuel directly into its combustion chamber, thereby to improve fuel consumption and reduce harmful exhaust gas components.

The direct injection type gasoline engine injects fuel, for example, from a fuel injection valve directly into a cavity provided at the top of a piston, thereby to produce an air-fuel mixture having an air-fuel ratio close to the theoretical mixture ratio around an ignition plug in accordance with ignition timing. Thus, in the case of the direct injection type gasoline engine, ignition is ensured even when an air-fuel mixture having an overall lean air-fuel ratio is supplied. Accordingly, it is possible to reduce discharge of CO and HC. Further, it is possible to largely improve fuel consumption at the time of idling and light-load driving. Furthermore, it is possible to improve acceleration and deceleration response, since, unlike a manifold fuel injection type engine, the direct injection type gasoline engine is free from a lag in fuel feeding due to an intake pipe, when injection quantity is increased or decreased.

The direct injection type gasoline engine has, however, such a problem that when a large quantity of fuel is injected, for example, at the time of heavy-load driving, an air-fuel ratio becomes over-rich in the vicinity of the ignition plug, which causes misfires. In order to solve the problem, for example, Japanese Patent Preliminary Publication No. Hei 7-102976 discloses a technique of driving an internal combustion engine in a compression stroke injection mode in which fuel is injected mainly in a compression stroke, or in an intake stroke injection mode in which fuel is injected mainly in an intake stroke.

The compression stroke injection mode is a mode in which fuel is injected into a cavity (for example, in the form of a basin portion or a recessed portion) provided at the top of a piston during the compression stroke, thereby to produce an air-fuel mixture having a air-fuel ratio (ratio by weight of air to fuel) close to the theoretical mixture ratio locally around the ignition plug and in the cavity. It is desirable as an fuel injection mode for light-load driving. The intake stroke injection mode is a mode in which fuel is injected outside the aforementioned cavity during the intake stroke, thereby to produce a homogeneous air-fuel mixture having a lean air-fuel ratio throughout the combustion chamber. It is desirable as an fuel injection mode for heavy-load driving.

In each of those fuel injection modes, fuel injection timing is determined as follows: First, injection-valve opening time is determined based on fuel pressure and fuel injection quantity. Then, injection end timing is so determined that fuel injection may end during the intake stroke or the compression stroke. Then, injection start timing is determined based on the aforementioned injection end timing and the injection-valve opening time. Particularly in the compression stroke injection mode, the injection end timing and the injection start timing are so determined, considering also a time required for fuel atomization, that fuel in the cavity may be completely atomized at the time of ignition, in order to prevent incomplete combustion.

When the aforementioned fuel injection modes are adopted with a view to improving fuel consumption, it is desirable that driving regions in which the internal combustion engine is driven at a lean air-fuel ratio in the aforementioned fuel injection modes are determined to be as large as possible. Such driving regions are determined depending on load and engine speed of the internal combustion engine. However, when the driving regions in which the internal combustion engine is driven in the aforementioned compression stroke injection mode or in the intake stroke injection mode are determined to be large, deterioration of a state of combustion may be produced.

For example, when fuel injection quantity during the compression stroke increases with an increase in load on the internal combustion engine, an air-fuel ratio may become over-rich, which causes misfires. Inversely, when an air-fuel ratio becomes too lean during the intake stroke, incomplete combustion (insufficient combustion) may be produced. When deterioration of combustion such as misfires, incomplete combustion (insufficient combustion) or the like is produced, it is necessary to detect such a state quickly and rectify conditions of combustion. Conditions of combustion are rectified, for example, by retarding the ignition timing (in the case where the air-fuel ratio has become over-rich), or by enriching the air-fuel ratio (in the case where the air-fuel ratio has become lean during the intake stroke).

In the case of conventional internal combustion engines, cycle-by-cycle variation of combustion is judged from angular acceleration or angular acceleration deviation of the engine based on the same criterion, regardless of the fuel injection mode. Therefore, a critical lean level of an air-fuel ratio in each of the aforementioned fuel injection modes can not be surely judged. Deterioration of combustion such as misfires, incomplete combustion (insufficient combustion) or the like varies according as the fuel injection mode is the compression stroke injection mode, the intake stroke injection mode or a normal injection mode in which the internal combustion engine is driven at the theoretical mixture ratio. Nevertheless, in the case of conventional internal combustion engines, quantity of variation of combustion is judged based on the same criterion, so that deterioration of combustion, which varies depending on the fuel injection mode, can not be surely judged.

SUMMARY OF THE INVENTION

The object of the present invention is to provide a combustion control device for an internal combustion engine provided with a plurality of fuel injection modes based on different target air-fuel ratios to be driven selectively changing the fuel injection mode, the combustion control device being capable of surely detecting deterioration of a state of combustion in the internal combustion engine according to each fuel injection mode and depending on features of variation of combustion which are peculiar to each fuel injection mode.

According to one embodiment of the present invention, a combustion control device for an internal combustion engine comprises fuel injection mode control means for choosing, from a plurality of fuel injection modes provided based on different target air-fuel ratios, a single fuel injection mode for determining conditions of driving the internal combustion engine, combustion variation detecting means for detecting quantity of variation of combustion in the internal combustion engine, and combustion deterioration judging means for comparing, according to a fuel injection mode currently chosen from the plurality of fuel injection modes, quantity of variation of combustion detected by the combustion variation detecting means with a threshold value corresponding to the fuel injection mode currently chosen from side plurality of fuel injection modes, thereby judging deterioration of combustion in the internal combustion engine. The threshold value is determined separately for each of the plurality of fuel injection modes according to each phenomenon indicating deterioration of combustion in the internal combustion engine.

Desirably, the combustion variation detecting means is so provided as to detect quantity of variation of combustion in the form of quantity of revolution fluctuation which is obtained from angular velocity or angular velocity deviation of a rotation axis of the internal combustion engine.

In a desirable embodiment, a combustion control device for an internal combustion engine according to the present invention is applied to a direct injection type internal combustion engine which injects fuel directly into a combustion chamber thereof. The plurality of fuel injection modes include a compression stroke injection mode for injecting fuel mainly in a compression stroke and driving the internal combustion engine at a lean air-fuel ratio which is leaner than the theoretical mixture ratio and an intake stroke injection mode for injecting fuel mainly in an intake stroke and driving the internal combustion engine at an air-fuel ratio which is leaner than the theoretical mixture ratio and richer than the lean air-fuel ratio in the compression stroke injection mode, and a threshold value for judging deterioration of combustion in the compression stroke injection mode is determined to be larger than a threshold value for judging deterioration of combustion in the intake stroke injection mode.

That is, threshold values on the basis of which quantity of variation of combustion is evaluated are so determined that those in the compression stroke injection mode are larger than those in the intake stroke injection mode, considering that deterioration of combustion in the compression stroke injection mode appears as large and discrete changes in revolution fluctuation, and that deterioration of combustion in the intake stroke mode appears as gradually increasing revolution fluctuation.

In a desirable embodiment, a threshold value for judging deterioration of combustion in the compression stroke injection mode is so determined as to substantively correspond to quantity of variation of combustion with which the internal combustion engine falls into a complete misfire state.

Further, in a desirable embodiment, threshold values for judging deterioration of combustion in the intake stroke injection mode consist of a first threshold value substantively corresponding to quantity of variation of combustion with which the internal combustion engine falls into a complete misfire state and a second threshold value substantively corresponding to quantity of variation of combustion with which the internal combustion engine falls into an unstable combustion state.

In another desirable embodiment, the combustion control device further comprises combustion condition rectifying means for rectifying conditions of combustion for the internal combustion engine according to a fuel injection mode currently chosen from the plurality of fuel injection modes when deterioration of combustion in the internal combustion engine is detected according to the currently chosen fuel injection mode.

Desirably, combustion condition rectifying means is so provided as to rectify conditions of combustion by changing timing for injecting fuel and timing for igniting injected fuel.

The present invention has an advantage that deterioration of combustion in the internal combustion engine, which appears in the manner peculiar to each fuel injection mode, can be surely detected, since deterioration of combustion in the internal combustion engine is judged by evaluating detected quantity of variation of combustion in the internal combustion engine on the basis of a threshold value determined for each fuel injection mode according to features of variation of combustion in each fuel injection mode.

In a desirable embodiment, threshold values in respect of quantity of variation of combustion in the internal combustion engine are so determined that those for judging deterioration of combustion in the compression stroke injection mode are larger than those for judging deterioration of combustion in the intake stroke injection mode. This provides an advantage of preventing false judgment in each fuel injection mode and making it possible to surely judge deterioration of combustion in each fuel injection mode.

Further, a threshold value for judging deterioration of combustion in the compression stroke injection mode is so determined as to substantively correspond to quantity of variation of combustion with which the internal combustion engine falls into a complete misfire state. This makes it possible to quickly and surely detect deterioration of combustion before incomplete combustion (insufficient combustion) in the compression stroke injection mode results in a misfire state.

Further, threshold values for judging deterioration of combustion in the intake stroke injection mode consist of a first threshold value substantively corresponding to quantity of variation of combustion with which the internal combustion engine falls into a complete misfire state and a second threshold value substantively corresponding to quantity of variation of combustion with which the internal combustion engine falls into an unstable combustion state. This makes it possible to detect deterioration of combustion, which proceeds gradually from incomplete combustion (insufficient combustion) to a misfire state, at the stage of insufficient combustion and at the stage of a misfire state, respectively.

In another embodiment, when deterioration of combustion in the internal combustion engine is detected according to the currently chosen fuel injection mode, conditions of combustion are rectified according to that fuel injection mode. This is advantageous to the internal combustion engine which is driven changing the fuel injection mode, since it provides a possibility of improving fuel consumption without deteriorating drivability of the internal combustion engine.

BRIEF DESCRIPTION OF THE DRAWINGS

FIG. 3 is a diagram showing an example of fuel injection control regions depending on load and engine according to an embodiment of the present invention;

DETAILED DESCRIPTION OF THE PREFERRED EMBODIMENTS

Figure 1:
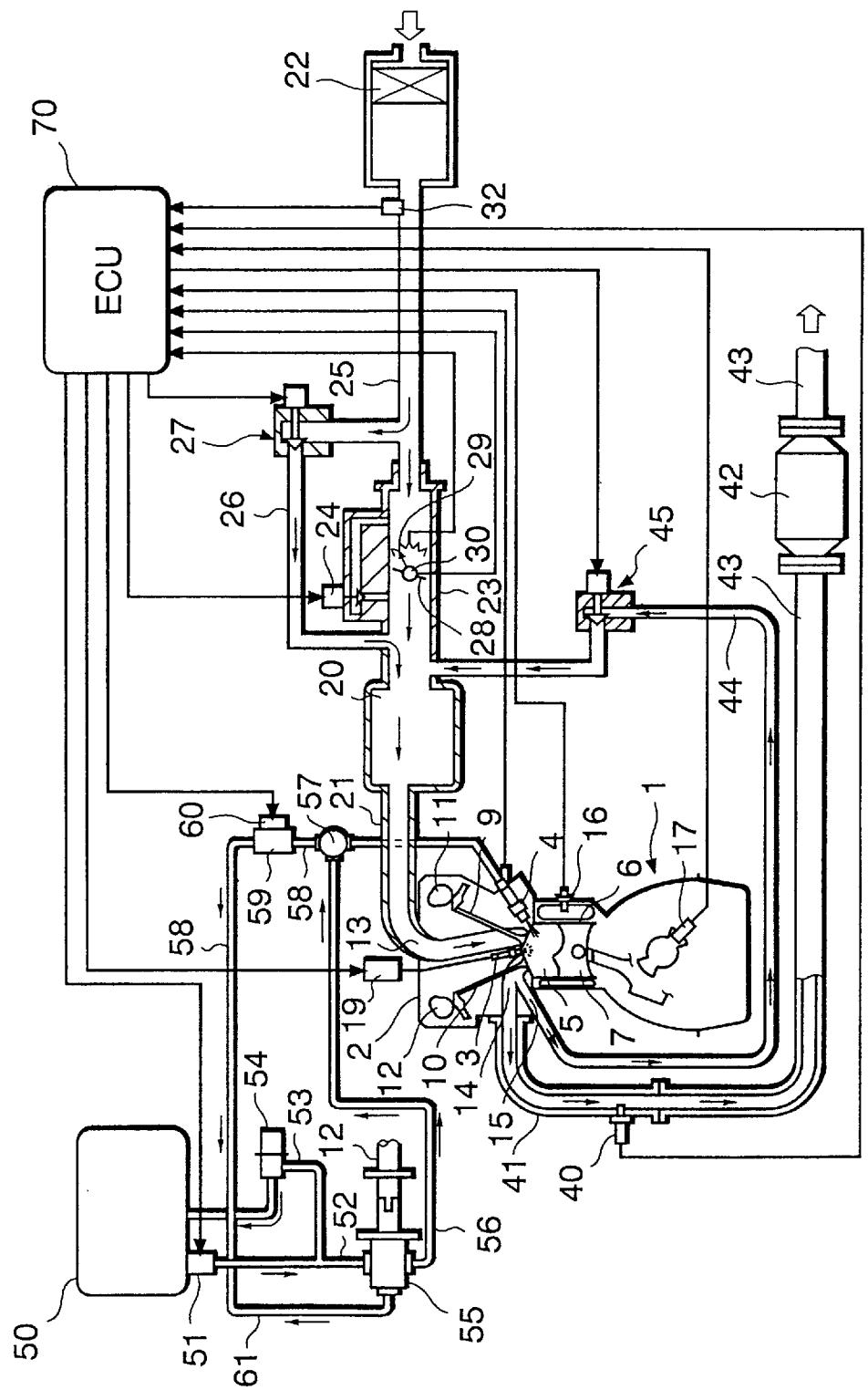
FIG. 1 is a diagram showing schematic formation of an engine control system including a combustion control device for an internal combustion engine according to an embodiment of the present invention.

A combustion control device for an internal combustion engine according to an embodiment of the present invention will be hereunder described referring to the drawings.

FIG. 1 is a diagram showing schematic formation of an engine control system to which the present invention is applied. Reference numeral 1 indicates a direct injection type four-cylinder-in-line gasoline engine for a vehicle. The engine 1 has schematic formation of which an essential part is shown in vertical section in FIG. 2. Combustion chambers, an intake device, an EGR device and so forth are designed particularly for the direct injection type gasoline engine.

An ignition plug 3 and an electromagnetic fuel injection valve 4 for each cylinder are mounted on a cylinder head 2 of the engine 1. Fuel is injected from the fuel injection valve 4 directly into a combustion chamber 5. A piston 7 is held in each cylinder 6 of the engine 1 slidably in the vertical direction, and a cavity 8 in the shape of a hemisphere is formed at the top face of the piston 7, being so located that fuel spray injected from the fuel injection valve 4 in the latter stage of the compression stroke of the piston 7 may reach the cavity 8. The theoretical compression ratio of the engine 1 is determined to be larger than that of the manifold fuel injection type engine in general (12 in the present embodiment). The valve train of the engine 1 is of DOHC four-valve type, and an intake camshaft 11 and an exhaust camshaft 12 for driving an intake valve 9 and an exhaust valve 10 respectively are located at an upper portion of the cylinder head 2 and held rotatablly.

An intake port 13 is formed at the cylinder head 2, extending nearly in the vertical direction substantively between the aforementioned camshafts 11 and 12. An intake flow passing through the intake port 13 produces a reverse tumble flow of mixture inside the combustion chamber 5. An exhaust port 14 is formed to extend in a direction approximately parallel to the cylinder head 2, as in the case of conventional engines. Obliquely below an exhaust port 15, there is provided a large-diameter EGR port 15 (not shown in FIG. 2), branching from the exhaust port 15.

Reference numeral 16 indicates a coolant temperature sensor for detecting temperature of cooling water Tw, 17 a vane-type crank angle sensor for outputting a crank angle signal SGT when each cylinder takes a predetermined crank position (for example, BTDC 5° and BTDC 75°), and 19 an ignition coil for supplying a high voltage to the ignition plug 3. A camshaft which revolves at a speed half as much as the crank shaft is provided with a cylinder discriminating sensor (not shown) for outputting a cylinder discriminating signal SGC. Based on the cylinder discriminating signal SGC outputted from the cylinder discriminating sensor, it is judged which cylinder causes a crank angle signal SGT.

Figure 2:
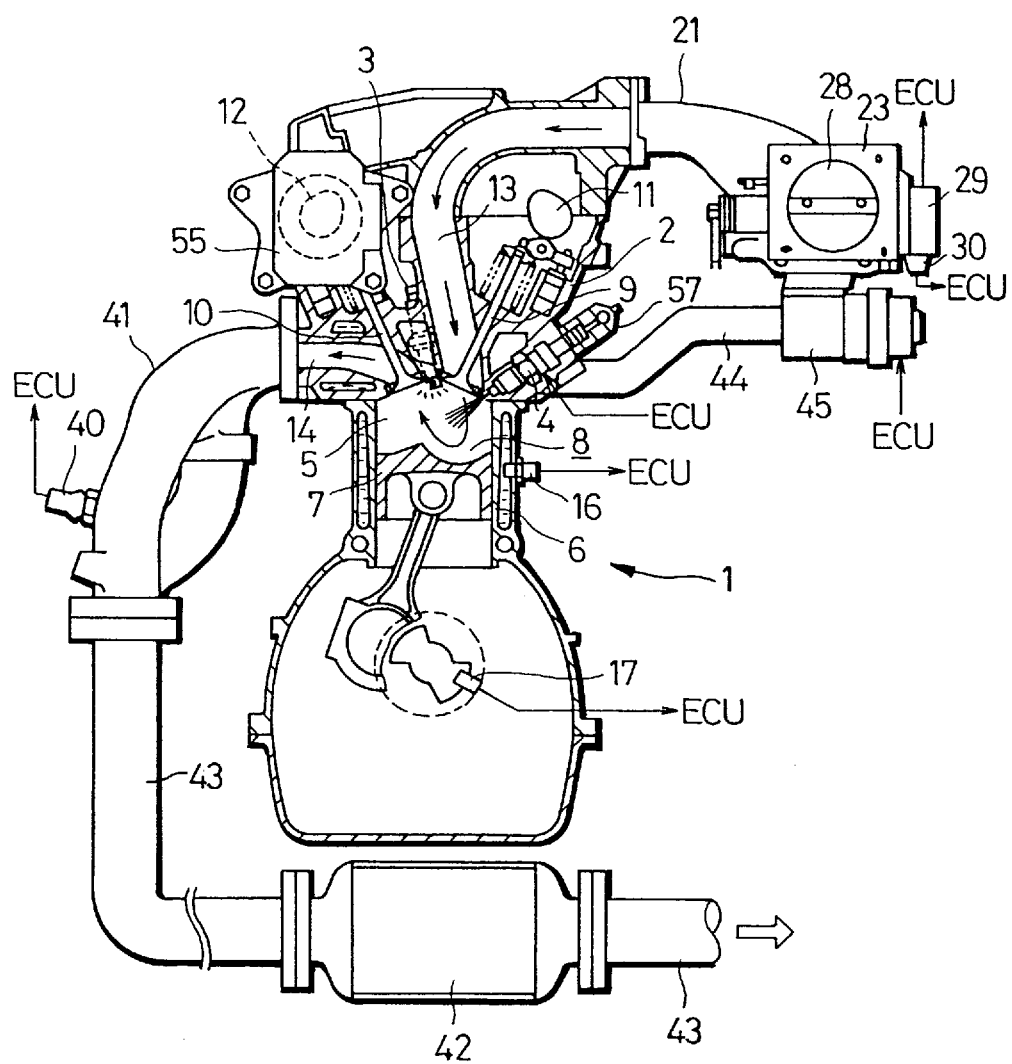
FIG. 2 is a vertical sectional view of an essential part of a direct injection type gasoline engine according to an embodiment of the present invention.

As shown in FIG. 2, an intake manifold 21 provided with a surge tank 20 is connected to the intake port 13, and an intake pipe 25 is connected to the intake manifold 21. The intake pipe 25 is provided with an air flow sensor 32, an air cleaner 22, a throttle body 23 and a step motor type first air bypass valve (#1ABV) 24. The intake pipe 25 is further provided with a large-diameter air bypass pipe 26 for introducing intake air into the intake manifold 21, bypassing the throttle body 23. The air bypass pipe 26 is provided with a linear solenoid type second air bypass valve (#2ABV) 27 interposed therein. The air bypass pipe 26 has a flow path area proportionate to that of the intake pipe 25, and used to allow such a quantity of intake air as required in a low or middle speed region of the engine 1 to flow appropriately when #2ABV27 is fully opened.

The throttle body 23 is provided with a butterfly type throttle valve 28 for opening and closing its flow path. The throttle body 23 is further provided with a throttle position sensor 29 for detecting an angle θTH of the throttle valve 28 and an idle switch 30 for detecting a fully closed state of the throttle valve 28. The throttle position sensor 29 outputs a throttle voltage VTH corresponding to an angle θTH of the throttle valve 28. The ECU 70 detects the throttle voltage VTH, thereby to judge the angle θTH of the throttle valve 28. An air flow sensor 32 detects intake air quantity Qa, and is, for example, a Karman vortex air flow sensor. The intake air quantity Qa may be obtained from manifold pressure in the intake manifold 21 detected by a boost pressure sensor provided to the surge tank 20.

An exhaust manifold 41 provided with an $O_2$ sensor 40 is connected to the exhaust port 14, and a three-way catalyst 42 and an exhaust pipe 43 provided with a muffler (not shown) are connected to the exhaust manifold 41. The EGR port 15 is connected through a large-diameter EGR pipe 44 to the upstream portion of the intake manifold 21. The EGR pipe 44 is provided with a step motor type EGR valve 45 interposed therebetween.

A fuel tank 50 is provided in the rear portion of a vehicle body (not shown). Fuel stored in the fuel tank 50 is pumped up by a motor type low pressure fuel pump 51, and fed through a low pressure feed pipe 52 to the engine 1 side. The pressure of supplied fuel (fuel pressure) in the low pressure feed pipe 52 is regulated to be a relatively low value (lower fuel pressure) by a first fuel pressure regulator 54 interposed in a return pipe 53. The fuel supplied to the engine 1 side is fed from a high pressure fuel pump 55 connected with the cylinder head 2 through a high pressure feed pipe 56 and a delivery pipe 57 to each of the aforementioned fuel injection valves 4.

The fuel pressure in the delivery pipe 57 is regulated to be a relatively high value (higher fuel pressure) by a second fuel pressure regulator 59 interposed in the return pipe 58. An electromagnetic fuel pressure changeover valve 60 connected to the second fuel pressure regulator 59 has a function of lowering the fuel pressure in the delivery pipe 57 to the aforementioned lower fuel pressure by relieving fuel when it is on. The fuel having been used for lubrication and cooling of the high pressure fuel pump 55 is returned through a return pipe 61 to the fuel tank 50.

An engine control unit (ECU) 70 for conducting general control of the engine 1 comprises an input-output device, storage devices (ROA, RAM, etc.) having control programs and control maps stored therein, a central processing unit (CPU), a timer counter and so forth (not shown). The ECU 70 determines a fuel injection mode and fuel injection quantity based on detected information inputted from the aforementioned various sensors, determines ignition timing and EGR gas quantity to be introduced, and controls driving of the fuel injection valve 4, the ignition coil 19, the EGR valve 45 and so forth. A variety of warning lights and apparatuses as well as a plurality of switches and other sensors (not shown) are also connected with the ECU 70.

Next, a basic flow of engine control by the engine control system having the aforementioned formation will be briefly described.

When an ignition key is operated to be on while the engine 1 is cold, the ECU 70 turns the low pressure fuel pump 51 and the fuel pressure changeover valve 60 on, so that the low pressure fuel pump 51 starts to feed fuel through the fuel pressure changeover valve 60 to the fuel injection valve 4. In this state, when the ignition key is operated for starting, cranking of the engine 1 is performed by a cell motor (not shown), and at the same time, fuel injection control is started under the control of the ECU 70. At this time, since a fuel vaporization ratio is low, the ECU 70 so controls fuel injection as to produce a relatively rich air-fuel ratio. At this start time, since #2ABV 27 is closed under the control of the ECU 70, intake air is supplied through a gap in the throttle valve 28 and #1ABV 24 to the combustion chamber 5. #1ABV 24 and #2ABV 27 are controlled in a unified manner by the ECU 70, and openings of those valves are determined depending on what quantity of intake air bypassing the throttle valve 28 (bypass air) needs to be introduced.

When starting is completed and the engine 1 starts idle driving, the high pressure fuel pump 55 starts rated discharge operation. At this time, the ECU 70 turns the fuel pressure changeover valve 60 off, so that the high pressure fuel pump 55 starts to feed high pressure fuel to the fuel injection valve 4. Until the temperature of cooling water Tw rises to a predetermined value, the ECU 70 controls fuel injection in the same manner as at the start time, thereby to keep a rich air-fuel ratio. During that time, the ECU 70 continues to close #2ABV 27.

Control of idle speed according to increase and decrease in load due to auxiliary equipment such as an air-conditioner and so forth is performed using #1ABV 24 as in the case of manifold fuel injection type engines. When a predetermined cycle is completed and an $O_2$ sensor 40 is activated, the ECU 70 starts feedback control of an air-fuel ratio according to an output voltage from the $O_2$ sensor 40. At that time, the three-way catalyst 42 removes harmful exhaust gas components outputted from the exhaust port 14. Thus, while the engine 1 is cold, the ECU 70 performs substantively the same fuel injection control as in the case of manifold fuel injection type engines.

When warm-up of the engine 1 is completed, the ECU70 detects a current fuel injection control region referring to a fuel injection control map, for example, as shown in FIG. 3, based on an engine speed Ne and a target average effective pressure Pe which is obtained from an intake air quantity Qa, a throttle angle θTH or the like. According to the fuel injection control region detected referring to the fuel injection control map, the ECU70 determines a fuel injection mode, fuel injection quantity and fuel injection timing, and drives the fuel injection valve 4. In association therewith, the ECU 70 also performs opening and closing control of #1ABV 24, #2ABV 27 and the EGV valve 45. The fuel injection quantity by the fuel injection valve 4 is in proportion to valve opening time of the fuel injection valve 4.

When the engine 1 is in a light-load driving region as at the time of idle driving or low-speed driving, a compression lean region is chosen as the fuel injection control region from the fuel injection map shown in FIG. 3. At that time, the ECU 70 chooses a compression stroke injection mode as the fuel injection mode for the engine 1. The ECU 70 opens #2ABV 27, and so controls the fuel injection that a lean average air-fuel ratio (for example, 30~40 or so) is produced in that state. At that time, an intake air flow flowing from the intake port 13 into the combustion chamber 5 forms a reverse tumble flow. Further, the fuel vaporization ratio rises as the engine 1 is warmed up. Thus, fuel spray injected from the fuel injection valve 7 is preserved in the cavity 8 of the piston 7. As a result, an air-fuel mixture having an air-fuel ratio close to the theoretical mixture ratio is formed around the ignition plug 3 in a stratified manner at the time of ignition. Thus, ignition of fuel spray is ensured even when an overall air-fuel ratio is lean.

In this state, the control of idle speed according to increase or decrease in load due to the auxiliary equipment is performed, for example, by increasing or decreasing the fuel injection quantity. In this control region (compression lean region), the ECU 70 opens the EGR valve 45. Therefore, a large quantity of EGR gas (for example, more than 30%) is introduced into the combustion chamber 5, so that generation of NOx is largely reduced.

When the engine 1 is in a medium-load driving region as at the time of constant-speed driving, an intake lean region or a stoichio-feedback region is chosen from the fuel injection control map shown in FIG. 3, depending on a state of load and engine speed Ne. At that time, the ECU 70 chooses an intake stroke injection mode, and so injects fuel as to produce a predetermined air-fuel ratio. Specifically, when the intake lean region is chosen, ECU 70 controls valve openings of #1ABV 24 and #2ABV 27 and fuel injection quantity, thereby to produce a relatively lean air-fuel ratio (for example, 20~30 or so). On the other hand, when the stoichio-feedback region is chosen, ECU 70 performs feedback control of an air-fuel ratio according to the output voltage from the $O_2$ sensor 40, controlling at the same time opening and closing of #2ABV 27 and the EGR valve 45.

In this case, fuel spray injected into the combustion chamber 5 is disturbed by a reverse tumble flow which is formed by an intake air flow flowing from the intake port 13, thereby to spread all over inside the combustion chamber 5. Thus, ignition is ensured even when an air-fuel ratio is lean. Further, when the stoichio-feedback region is chosen, harmful exhaust gas components are removed by the three-way catalyst 42. At that time, the ECU 70 controls the EGR valve 45, thereby to introduce an appropriate amount of EGR gas into the combustion chamber 5, so that NOx generated at the time of combustion is reduced.

When the engine 1 is in a weight-load driving region as at the time of rapid-acceleration driving or high-speed driving, an open-loop control region is chosen from the fuel injection control map shown in FIG. 3. At that time, the ECU 70 chooses an intake stroke injection mode. The ECU 70 closes #2ABV 27, and controls the fuel injection according to an throttle angle θTH and engine speed Ne, thereby to produce a relatively rich air-fuel ratio. Incidentally, when the engine 1 is in a state of coasting during a midium-high-speed driving, a fuel cut region is chosen from the fuel injection control map shown in FIG. 3. At that time, the ECU 70 performs stopping control of fuel injection. The fuel cut state is interrupted immediately when the engine speed Ne becomes lower than a predetermined value or when an accelerator pedal is stepped on.

In the internal combustion engine in which fuel injection modes are changed and determined according to a state of driving state basically in the aforementioned manner, the judgment of deterioration of combustion such as misfires, incomplete combustion (insufficient combustion) and the like is, according to an embodiment of the present invention, performed as follows.

Figure 4:
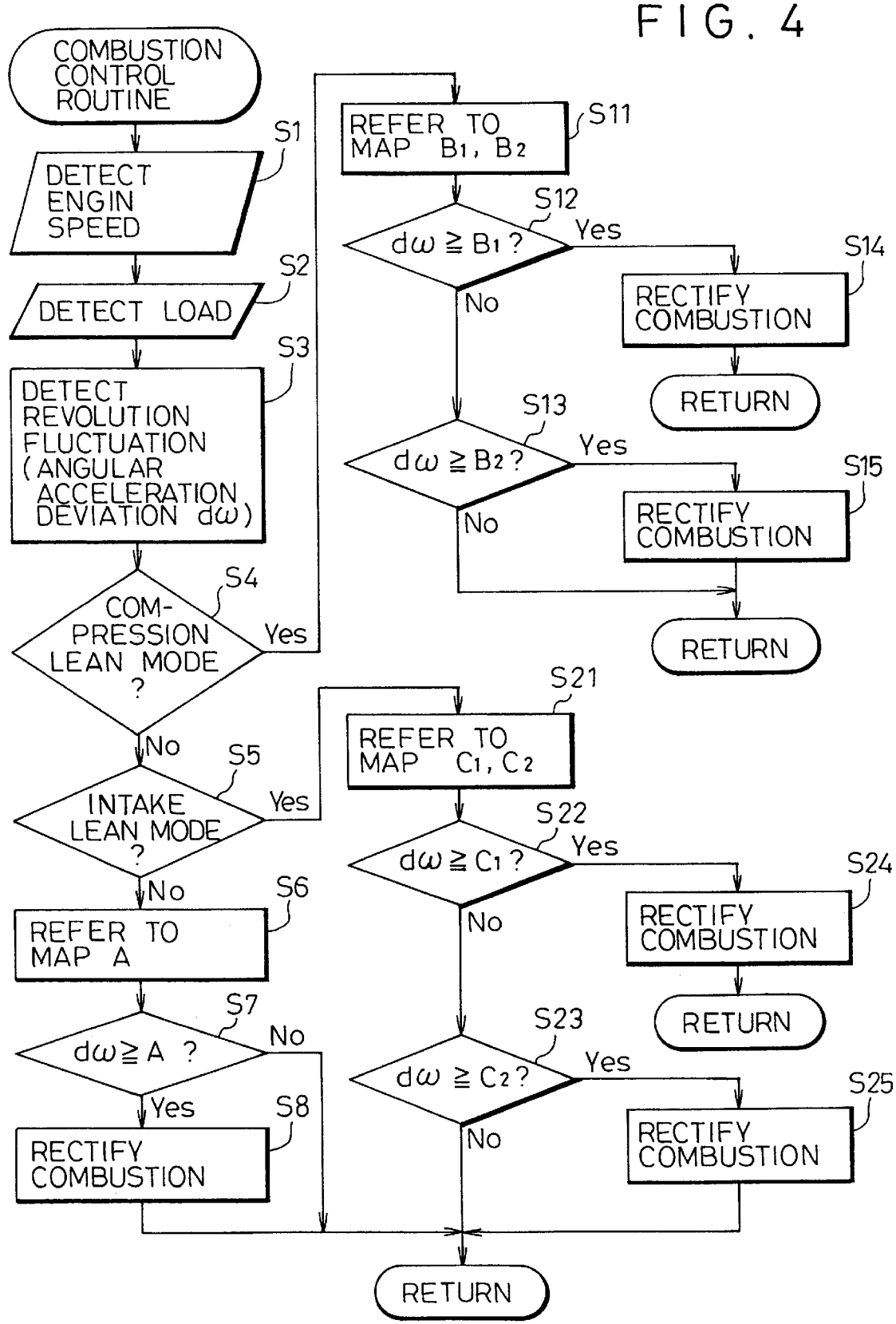
FIG. 4 is a diagram showing process of judgment of deterioration of combustion in each fuel injection mode according to an embodiment of the present invention.

FIG. 4 shows an example of judgment procedure (combustion control routine). The procedure starts with detection of revolution (engine speed Ne) and driving load Pe of the engine 1 [Steps S1, S2]. Then, in order to detect cycle-by-cycle variation of combustion (revolution fluctuation) of the engine 1, for example, revolution angle acceleration $\omega$ or revolution angle acceleration deviation do of a rotation axis (crankshaft) of the engine 1 is obtained as an evaluation value (evaluation object) [Step 3]. Then, the fuel injection mode currently chosen for the engine 1 is detected. The judgment of the currently chosen fuel injection mode is, for example, performed in such order that whether it is a compression stroke injection mode (compression lean mode)or not is first judged [Step 4], and then whether it is an intake stroke injection mode (intake lean mode) or not is judged [Step 5].

If the currently chosen fuel injection mode is judged to be neither a compression stroke injection mode nor an intake stroke injection mode, it is considered to be a stoichio-injection mode in which the engine is driven at a normal theoretical mixture ratio. In this case, a threshold value A in respect of revolution fluctuation of the engine 1, based on which a misfire state of the engine 1 in the stoichio-injection mode is judged, is obtained referring to a first map which describes threshold values predetermined depending on engine speed Ne and driving load Pe of the engine 1 in the stoichio-injection mode [Step S6].

Then, for example, the aforementioned revolution angle acceleration deviation $d\omega$, which is obtained as an evaluation value for evaluating cycle-by-cycle variation of combustion, is compared with the threshold value A, and if the former is larger than the latter, it is judged that the engine 1 is in a deteriorated state of combustion (a misfire state) [Step S7]. When deterioration of combustion is detected in this manner, conditions of combustion are rectified [Step S8]. In stead of rectifying conditions of combustion, no measures may be taken except for memorizing the fact that deterioration of combustion is produced, or if necessary, only such measures as outputting a warning of deterioration of an ignition plug function and so forth may be taken, since, in this case, optimization of a state of combustion of the engine 1 is taken care of through the feedback control of the air-fuel ratio.

At the aforementioned Step S4, if the currently chosen fuel injection mode is judged to be a compression stroke injection mode, a threshold value B1 in respect of revolution fluctuation of the engine 1, based on which an incomplete combustion (insufficient combustion) state of the engine 1 in the compression stroke injection mode is judged, and a threshold value B2 in respect of revolution fluctuation of the engine 1, based on which a misfire state of the engine 1 in the compression stroke injection mode is judged, are obtained referring to a second map which describes threshold values predetermined depending on engine speed Ne and driving load Pe of the engine 1 in the compression stroke injection mode [Step S11].

Then, the revolution angle acceleration deviation $d\omega$ detected as mentioned above is compared with the threshold values B1 and B2 in order, thereby to judge whether a state of combustion in the compression stroke injection mode is deteriorated or not, namely, whether the engine 1 is in an incomplete combustion (insufficient combustion) state or not, and whether it is in a misfire state or not [Steps S12 and S13]. When deterioration of combustion is detected in this manner, conditions of combustion are rectified in order to remedy the deteriorated state to secure a stable combustion state [Steps S14 and S15]. Conditions of combustion are rectified by retarding fuel injection timing and ignition timing.

Figure 5:
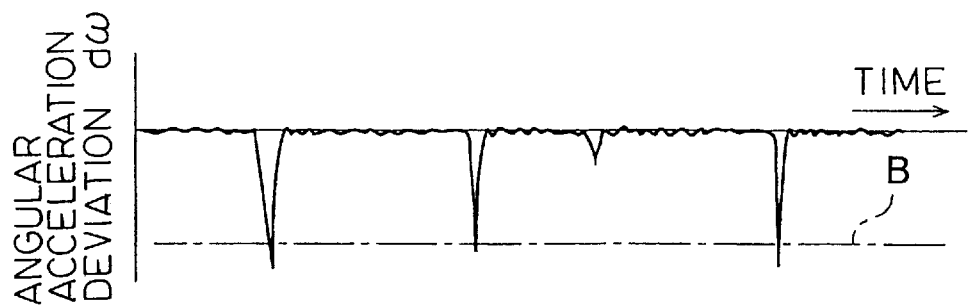
FIG. 5 is a diagram showing an example of revolution fluctuation of an internal combustion engine driven in a compression lean mode (a compression stroke injection mode)

Incomplete combustion (insufficient combustion ) in the compression stroke injection mode instantly induces a misfire, which appears as a large revolution fluctuation happening discontinuously (discretely), for example, as shown in FIG. 5. Therefore, a single threshold value B may be obtained considering the threshold value B1 for judging incomplete combustion to be approximately equal to the threshold value B2 for judging a misfire state, so as to perform only one of the judgment of incomplete combustion (insufficient combustion) and the judgment of a misfire state. It goes without saying that revolution angle acceleration $\omega$ may be used as an evaluation value for evaluating deterioration of combustion in addition to or instead of the revolution angle acceleration deviation $d\omega$ mentioned in the foregoing description.

Needless to say, when the revolution angle acceleration $\omega$ used as an evaluation value for evaluating deterioration of combustion, threshold values b (b1, b2) other than the threshold values B(B1,B2) in respect of the revolution angle acceleration deviation $d\omega$ need to be predetermined.

If the currently chosen fuel injection mode is judged not to be a compression stroke injection mode at Step S4 and then judged to be an intake stroke injection mode at Step S5, a threshold value C1 in respect of revolution fluctuation of the engine 1, based on which an incomplete combustion (insufficient combustion) state of the engine 1 in the intake stroke injection mode is judged, and a threshold value C2 in respect of revolution fluctuation of the engine 1, based on which a misfire state of the engine 1 in the intake stroke injection mode is judged, are obtained referring to a third map which describes threshold values predetermined depending on engine speed Ne and driving load Pe of the engine 1 in the intake stroke injection mode [Step S21].

Then, the revolution angle acceleration deviation $d\omega$ detected as mentioned above is compared with the threshold values C1 and C2 in order, thereby to judge whether a state of combustion in the intake stroke injection mode is deteriorated or not, namely, whether the engine 1 is in an incomplete combustion (insufficient combustion) state or not, and whether it is in a misfire state or not [Steps S22 and S23]. When deterioration of combustion, namely, incomplete combustion (insufficient combustion) or a misfire state is detected in this manner, conditions of combustion are rectified in order to remedy the state. [Steps S24 and S25]. Conditions of combustion are rectified, for example, by temporarily enriching an air-fuel ratio. Also in this case, the aforementioned revolution angle acceleration $\omega$ may be used as an evaluation value for evaluating deterioration of combustion. In that case, threshold values c (c1, c2) in respect of the revolution angle acceleration $\omega$ other than the threshold values C1,C2 need to be predetermined.

Next, the threshold values B(B1, B2) predetermined in the compression stroke injection mode and the threshold values C1, C2 predetermined in the intake stroke injection mode will be explained.

Figure 6:
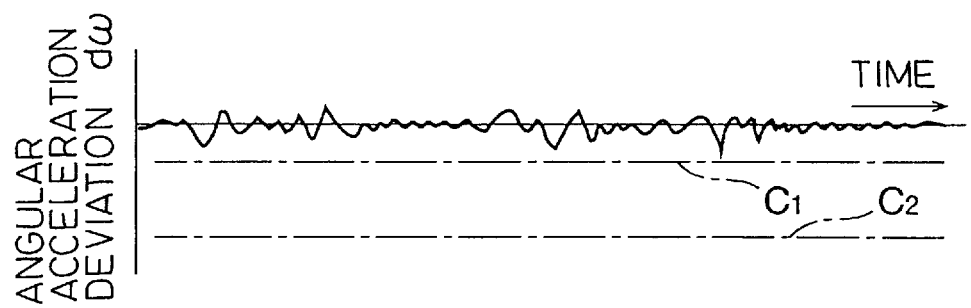
FIG. 6 is a diagram showing an example of revolution fluctuation of an internal combustion engine driven in an intake lean mode (an intake stroke injection mode)

Deterioration of combustion in the compression stroke injection mode appears, as mentioned above, as a large revolution fluctuation (a large quantity of revolution fluctuation) happening discontinuously (discretely) as shown in FIG. 5. On the other hand, deterioration of combustion in the intake stroke injection mode appears as such a phenomenon that a quantity of revolution fluctuation, which continuously minutely fluctuates, becomes gradually large according to deterioration of combustion, for example, as shown in FIG. 6.

Combustion in the compression stroke injection mode is relatively stable even when the air-fuel ratio somewhat fluctuates. Compared therewith, combustion in the intake stroke injection mode tends to be more sensitive to fluctuation of the air-fuel ratio.

Therefore, if the judgment of deterioration of combustion in the compression stroke injection mode is performed using the threshold value C1 as predetermined for detecting deterioration of combustion in the intake stroke injection mode, a small revolution fluctuation happening discretely is inappropriately judged to indicate deteriorated of combustion (a misfire state). On the other hand, if the judgment of deterioration of combustion (incomplete combustion) in the intake stroke injection mode is performed using the threshold value B as predetermined for detecting deterioration of combustion (a misfire state) in the compression stroke injection mode, deterioration of combustion fails to be detected, since revolution fluctuation indicative of deterioration of combustion is, in this case, small in quantity. To sum up, influence of cycle-by-cycle variation of combustion of the engine 1 on revolution thereof largely varies depending on the fuel injection mode. Therefore, deterioration of combustion in each fuel injection mode can not be surely judged, if quantity of revolution fluctuation, which is detected in the form of the aforementioned revolution angle acceleration ω or the revolution angle acceleration deviation dω, is evaluated based on a sole criterion.

Therefore, in the present invention, threshold values for judging deterioration of combustion are determined separately for each of a plurality of fuel injection modes provided based on different target air-fuel ratios, that is, for each of the compression stroke injection mode, the intake stroke injection mode and the stoichio-injection mode. Specifically, in each fuel injection mode, quantity of revolution fluctuation, which is an evaluation value (parameter) indicative of a state of combustion, is detected in the form of revolution angle acceleration ω and/or revolution angle acceleration deviation dω, and the threshold values determined for detecting a misfire state are determined to be larger than the threshold values determined for detecting incomplete combustion (insufficient combustion). Thus, in the foregoing example, the threshold values B1 (for judging insufficient combustion), B2 (for judging a misfire state), C1 (for judging insufficient combustion) and C2 (for judging a misfire state) are determined as follows:

The compression stroke injection mode: $B1 \leq B2 = B$

The intake stroke injection mode: $C1 < C2$.

Further, since a state of combustion in the compression stroke injection mode is more stable than that in the intake stroke injection mode, the threshold values B1 and C1 for judging insufficient combustion in respective fuel injection modes are basically determined as follows:

$C1 < B1$.

The threshold values for judging a misfire state in the respective fuel injection modes may be determined to be nearly equal to each other and nearly equal to the threshold value for judging a misfire state in the stoichio-injection mode. However, in the compression stroke injection mode, an insufficient combustion state is close to a misfire state. Therefore, in order to quickly and surely detect a misfire state in the compression stroke injection mode, the threshold values for judging a misfire state are desirably determined as follows:

$B2 < C2$.

In this case, it is desirable that the threshold value C1 for judging insufficient combustion in the intake stroke injection mode and the threshold value B2 for judging a misfire state in the compression stroke injection mode satisfy the following relation:

$C1 << B2$.

Figure 7:
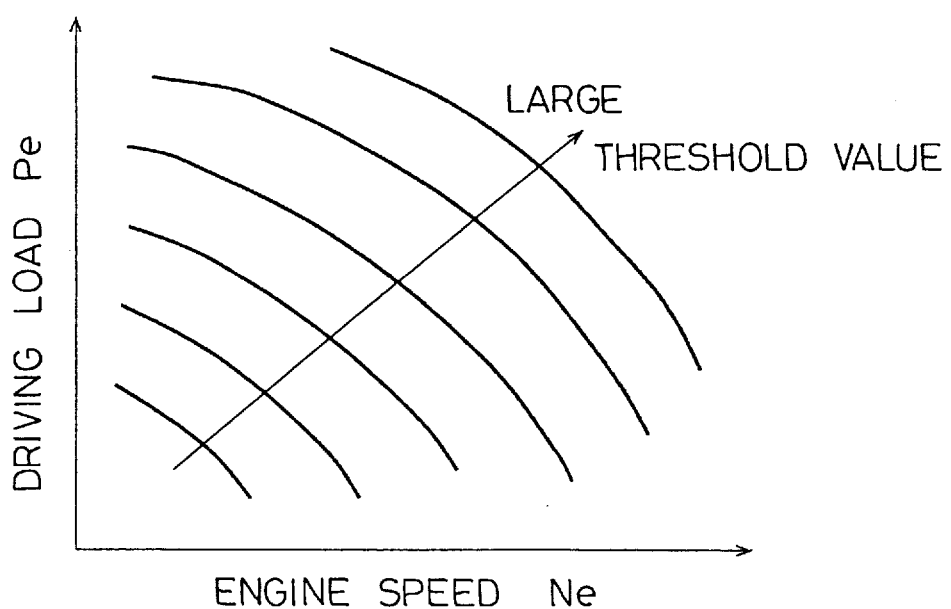
FIG. 7 is a diagram showing conditions of determining threshold values for judgment of deterioration of combustion, depending on variation of engine speed and load of an internal combustion engine.

A state of combustion of the engine 1 varies depending on engine speed Ne and driving load Pe. Therefore, in respect of the threshold values determined in each fuel injection mode for detecting deterioration of combustion, it is desirable to provide a data table or the like for each fuel injection mode, in which threshold values depending on engine speed Ne and driving load Pe are mapped in advance, for example, as shown in FIG. 7. A state of driving and a currently chosen fuel injection mode of the engine 1 are judged according to the aforementioned judgment routine shown in FIG. 4, and based on the result of the judgment, a data table is referred to, so that the threshold values suitable for the state of driving and the fuel injection mode of the engine 1 is each time obtained.

Thus, in the combustion control device according to an embodiment of the present invention, the threshold values for detecting deterioration of combustion in each of a plurality of fuel injection modes having different target air-fuel ratios are determined separately for each fuel injection mode. Therefore, deterioration of combustion (a misfire state) can be surely detected in each fuel injection mode. Particularly in the intake stroke injection mode in which combustion tends to be unstable as compared with the compression stroke injection mode, the threshold value C1 is determined in the manner mentioned above, thereby to make it possible to quickly and surely detect insufficient combustion.

In the compression stroke injection mode, even if a momentary misfire happens, combustion response is good after that. Further, combustion velocity in this mode is large at the time of normal combustion. Therefore, the threshold value B2 for judging a misfire state is determined in the manner described above, so that a small revolution fluctuation, which is caused by a momentary misfire and to be neglected, may remain undetected. Thus, an inappropriate judgment is effectively prevented.

As a result, deterioration of combustion can be surely detected according to each fuel injection mode, and rectification of conditions of combustion in response to deterioration of combustion can be performed suitably. For example, so-called fogging (wetting) of the ignition plug, which is caused by continuing to drive in a deteriorated state of combustion (a misfire state or an incomplete combustion state), can be prevented. As a result, such effects as keeping a stable state of combustion of the engine 1, thereby improving drivability can be obtained.

It is to be noted that the present invention is not limited to the aforementioned embodiment. Though the description of the embodiment has been made taking an example of the direct injection type gasoline engine, it can be also applied to the manifold fuel injection type gasoline engine. Combustion in the stoichio-injection mode is sufficiently stable as compared with that in the compression stroke injection mode or in the intake stroke injection mode. Therefore, judgment of deterioration of combustion in the stoichio-injection mode may be omitted. Needless to say, the manner of rectification of conditions of combustion performed when deterioration of combustion is detected in each fuel injection mode can be varied. In short, the present invention can be embodied with various modifications within a range not deviating from its essentials.

What is claimed is:

1. A combustion control device for an internal combustion engine, comprising:

fuel injection mode control means for choosing, from a plurality of fuel injection modes provided based on different target air-fuel ratios, a single fuel injection mode for determining conditions of driving an internal combustion engine;

combustion variation detecting means for detecting quantity of variation of combustion in said internal combustion engine; and combustion deterioration judging means for comparing, according to a fuel injection mode currently chosen from said plurality of fuel injection modes, quantity of variation of combustion detected by said combustion variation detecting means with a threshold value corresponding to the fuel injection mode currently chosen from said plurality of fuel injection modes, thereby judging deterioration of combustion in said internal combustion engine, said threshold value being determined separately for each of said plurality of fuel injection modes according to each phenomenon indicating deterioration of combustion in said internal combustion engine.

2. A combustion control device for an internal combustion engine according to claim 1, wherein said internal combustion engine is a direct injection type internal combustion engine which injects fuel directly into a combustion chamber thereof, said plurality of fuel injection modes include a compression stroke injection mode for injecting fuel mainly in a compression stroke and driving said internal combustion engine at a lean air-fuel ratio which is leaner than a theoretical mixture ratio and an intake stroke injection mode for injecting fuel mainly in an intake stroke and driving said internal combustion engine at an air-fuel ratio which is leaner than said theoretical mixture ratio and richer than said lean air-fuel ratio in said compression stroke injection mode, and a threshold value for judging deterioration of combustion in said compression stroke injection mode is determined to be larger than a threshold value for judging deterioration of combustion in said intake stroke injection mode.

3. A combustion control device for an internal combustion engine according to claim 1, wherein said internal combustion engine is a direct injection type internal combustion engine which injects fuel directly into a combustion chamber thereof, said plurality of fuel injection modes include a compression stroke injection mode for injecting fuel mainly in a compression stroke and driving said internal combustion engine at a lean air-fuel ratio which is leaner than a theoretical mixture ratio, and a threshold value for judging deterioration of combustion in said compression stroke injection mode is so determined as to substantively correspond to quantity of variation of combustion with which said internal combustion engine falls into a complete misfire state.

4. A combustion control device for an internal combustion engine according to claim 1, wherein said internal combustion engine is a direct injection type internal combustion engine which injects fuel directly into a combustion chamber thereof, said plurality of fuel injection modes include an intake stroke injection mode for injecting fuel mainly in an intake stroke and driving said internal combustion engine at a lean air-fuel ratio which is leaner than a theoretical mixture ratio, and threshold values for judging deterioration of combustion n said intake stroke injection mode consist of a first threshold value substantively corresponding to quantity of variation of combustion with which said internal combustion engine falls into a complete misfire state and a second threshold value substantively corresponding to quantity of variation of combustion with which said internal combustion engine falls into an unstable combustion state.

5. A combustion control device for an internal combustion engine according to claim 1, wherein said combustion control device further comprises combustion condition rectifying means for rectifying conditions of combustion for said internal combustion engine according to a fuel injection mode currently chosen from said plurality of fuel injection modes when deterioration of combustion in said internal combustion engine is detected according to said currently chosen fuel injection mode.

6. A combustion control device for an internal combustion engine according to claim 1, wherein said combustion variation detecting means detects quantity of variation of combustion in the form of quantity of revolution fluctuation which is obtained from angular velocity or angular velocity deviation of a rotation axis of said internal combustion engine.

7. A combustion control device for an internal combustion engine according to claim 5, wherein said combustion condition rectifying means rectifies conditions of combustion by changing timing for injecting fuel and timing for igniting injected fuel.

* * * * *